(12) United States Patent
Führer

(10) Patent No.: US 9,238,417 B2
(45) Date of Patent: Jan. 19, 2016

(54) ELECTRICAL PLUG CONNECTOR

(75) Inventor: Thomas Führer, Blomberg (DE)

(73) Assignee: PHOENIX CONTACT GMBH & CO. KG (DE)

( * ) Notice: Subject to any disclaimer, the term of this patent is extended or adjusted under 35 U.S.C. 154(b) by 156 days.

(21) Appl. No.: 14/116,866

(22) PCT Filed: May 16, 2012

(86) PCT No.: PCT/EP2012/059104
§ 371 (c)(1),
(2), (4) Date: Jan. 24, 2014

(87) PCT Pub. No.: WO2012/159950
PCT Pub. Date: Nov. 29, 2012

(65) Prior Publication Data
US 2014/0187076 A1    Jul. 3, 2014

(30) Foreign Application Priority Data
May 20, 2011    (DE) .......................... 10 2011 050 536

(51) Int. Cl.
*H01R 13/62*    (2006.01)
*B60L 11/18*    (2006.01)
(Continued)

(52) U.S. Cl.
CPC ......... *B60L 11/1824* (2013.01); *B60L 11/1818* (2013.01); *H01R 13/62* (2013.01); *H01R 13/6397* (2013.01); *H01R 2107/00* (2013.01); *Y02T 10/7005* (2013.01); *Y02T 90/14* (2013.01)

(58) Field of Classification Search
CPC .. H01R 2103/00; H01R 13/639; H01R 33/94; H01R 13/6397; H01R 13/62933; H02J 7/025; Y02T 90/14
USPC ................. 439/188, 299, 300, 310, 304, 347; 320/108, 109
See application file for complete search history.

(56) References Cited

U.S. PATENT DOCUMENTS

| 6,914,346 B2 | 7/2005 | Girard |
| 7,950,943 B2* | 5/2011 | Ohtomo ........................ 439/299 |
| 8,262,402 B2* | 9/2012 | Gaul et al. .................... 439/304 |

(Continued)

FOREIGN PATENT DOCUMENTS

| DE | 10 2007 029 976 | 1/2009 |
| DE | 10 2009 043 845 | 3/2011 |

(Continued)

OTHER PUBLICATIONS

International Search Report dated Aug. 9, 2012 in Application No. PCT/EP2012/059104.

(Continued)

*Primary Examiner* — Thanh Tam Le
(74) *Attorney, Agent, or Firm* — Knobbe, Martens, Olson & Bear, LLP

(57) ABSTRACT

In one aspect, a plug connector for electrically connecting an electric vehicle to a charging device is provided. The plug connector is designed to establish an electrical connection to a second plug connector associated to the electric vehicle or the charging device. The plug connector includes an actuator which can be driven by an electrical pulse, adapted for locking and unlocking the plug connectors. The plug connector includes an energy source for generating the electrical pulse.

9 Claims, 2 Drawing Sheets

(51) Int. Cl.
   *H01R 13/639*  (2006.01)
   *H01R 107/00*  (2006.01)

(56) References Cited

U.S. PATENT DOCUMENTS

| | | | |
|---|---|---|---|
| 8,376,767 B2 * | 2/2013 | Kahara et al. | 439/304 |
| 8,616,904 B1 * | 12/2013 | Martin et al. | 439/188 |
| 8,723,477 B2 * | 5/2014 | Gaul et al. | 320/109 |
| 8,900,006 B2 * | 12/2014 | Gaul et al. | 439/489 |
| 8,951,060 B2 * | 2/2015 | Meyer-Ebeling | 439/347 |
| 2009/0082916 A1 | 3/2009 | Tanaka | |
| 2012/0071017 A1 | 3/2012 | Gaul et al. | |

FOREIGN PATENT DOCUMENTS

| | | |
|---|---|---|
| DE | 102009016504 A1 | 4/2011 |
| EP | 2293391 A2 | 3/2011 |
| WO | WO 2010/115927 | 10/2010 |

OTHER PUBLICATIONS

Office Action received in German Patent Application No. 10 2011 050 536.9 dated May 21, 2015.

* cited by examiner

ELECTRICAL PLUG CONNECTOR

REFERENCE TO RELATED APPLICATIONS

This application is the U.S. National Phase of International Application PCT/EP2012/059104, filed May 16, 2012, and claims priority to DE Application No 10 2011 050 536.9, filed May 20, 2011. Each of the priority applications is hereby incorporated by reference in its entirety.

FIELD

The invention relates to a plug connector for electrically connecting an electric vehicle to a charging device, wherein the plug connector is designed to establish an electrical connection to a second plug connector associated to the electric vehicle or the charging device.

BACKGROUND

In the area of E-mobility applications plug connectors including an electrical locking function are known and provided normatively for transmitting electrical energy from a charging device for charging a vehicle's secondary battery provided in the electric vehicle.

To this end a device plug can be provided at the charging device and at the electric vehicle, respectively, such that by means of a connecting cable comprising at both ends a cable connector corresponding to the device plug an electrical connection can be established between the charging device and the electric vehicle.

Realizing this electrical locking function can include mechanically retracting a cylinder pin perpendicular to the plug direction of the plug connector plugged completely up to its limit, wherein the cylinder pin is capable of penetrating the device plug and the cable connector in a radial direction through corresponding bores, such that in the locking process a tight fit in an axial direction can be created. In this way a manual disengagement of the connected plug connectors is prevented in order to avoid according to safety aspects that plug connectors under load cannot be separated from each other or a yet incomplete charging process of the vehicle's secondary battery will not be not interrupted. Normally the cylinder pin is driven electromechanically, for example by means of solenoids or actuators with an upstream mechanic.

Herein, solenoids often operate against a mechanical spring and need to be retained permanently in an end position, i.e. when the plug connectors are locked, under consumption of electrical energy. When the voltage supply fails the spring opens and unlocks the system automatically. It is, however, disadvantageous that the power required for activation has to be provided constantly by a control electronics and often amounts to several watts.

On the other hand actuators are typically driven by short alternately polarized current pulses and after reaching their end position remain passively in their locking and unlocking position, respectively. This means, that actuators do not consume any energy even in the locked state, for example during the charging process of the vehicle's secondary batteries of the electric vehicle. During a power breakdown event, particularly of the charging device, however, the actuators can no longer be driven, resulting in a permanent undesired locking state of the plug connectors.

A spring supported resetting of the actuators from the locking position to the unlocking position often is impossible or can be implemented only with extensive efforts for mechanical reasons. Even a pure mechanical emergency unlocking means which is operable, for example, by means of a cable wire often is excluded because to this end a permanent access to this unlocking means is required which, however, although principally possible, is often not desired for reasons of misuse, particularly at public charging facilities.

SUMMARY

Thus, it is an object of the invention to provide a particular simple solution for enabling an actuator driven locking and unlocking operation of the electrical connection of the plug connectors between the charging device and the electric vehicle even in the case of a power breakdown event of the charging device or the electric vehicle.

This object according to the invention is achieved by the features of the independent claim. Advantageous embodiments of the invention are disclosed in the dependent claims.

The object of the invention is achieved by a plug connector for electrically connecting an electric vehicle to a charging device, wherein the plug connector is designed to establish an electrical connection is provided with a second plug connector associated to the electric vehicle or to the charging device, wherein the plug connector comprises an actuator which can be driven by an electrical pulse and is adapted to lock and unlock the plug connectors preferably connected to each other, and wherein the plug connector comprises an energy source for generating the electrical pulse.

Thus, the invention describes a new approach in that the plug connector comprises an energy source for generating the electrical pulse, such that the energy required for locking and unlocking the plug connectors connected to each other can be provided by the plug connector itself. This has an enormous advantage in that during a power breakdown event, particularly of the charging device or a secondary battery associated to the electric vehicle, the actuator enables to unlock the plug connectors connected to each other.

Thus, the solution of the invention enables to remove a connecting cable, which is connected with a plug connector, i.e. a first plug connector, by means of the second plug connector, from the plug connector provided at the charging device or the electric vehicle, for example a cable connector from a device plug connector associated to the charging device or the electric vehicle. Because in this way, for example, the connecting cable can be removed from the electric vehicle during a power breakdown event of the charging device, the electric vehicle still remains in a running condition and a possible loss of the connecting cable at the start of the electric vehicle and the concomitant loss of a further charging opportunity is also counter-acted.

Thus, the invention provides the potential to store a sufficient amount of electrical energy by providing an energy source, such that during a power breakdown event the actuator can still be moved into an opposite end position, such that the locking state of plug connectors connected to each other can be released. Due to the fact that the plug connector comprises the energy source, wherein the energy source preferably is disposed within the housing of the plug connector, no adaption of the electric vehicle or the charging device is necessary, such that the inventive solution is particularly simple and universally usable for any electric vehicles and/or charging devices known in the prior art. Moreover, the plug connector of the invention with respect to its electrical contact with the second plug connector can be implemented as any plug connector known in the prior art adapted for an electrical connection between a charging device and an electric vehicle and to this end, for example, can comprise further locking and/or latch means which respectively can be locked and unlocked by the actuator. Moreover, the plug connector can be implemented as a coupling, a plug and/or a socket, wherein a person skilled in the art will be able to dimension the plug connector with respect to the current to be transferred between the electric vehicle and the charging device. Moreover the plug connector and/or the second plug connector can be implemented as a device connector or a cable connector, wherein the plug connector preferably is implemented as a device connector and the second plug connector as a cable connector. Moreover, it is preferred that the plug connector for establishing an electrical connection is configured with a second plug connector associated to a connecting cable, wherein the connecting cable can be provided for electrical connection between the electric vehicle and the charging device.

Principally the energy source can be implemented in an arbitrary way. However, according to a preferred embodiment of the invention it is provided that the energy source is implemented as a secondary battery, a capacitor and/or an inductor. Moreover, it is possible to implement the energy source as a battery, however, preferably a secondary battery is used. In the case of a capacitor as an energy source a person skilled in the art preferably will provide a resistor, over which the capacitor can be charged up to its operating voltage. If now a power breakdown event occurs at the charging device and/or at the electric vehicle the capacitor can be connected to the secondary battery in an appropriate way, such that the capacitor is discharged over the actuator and thus provides a sufficient amount of energy for the secondary battery, so that the actuator is able to unlock the plug connectors connected to each other. Moreover, a person skilled in the art will be able to dimension the secondary battery, the capacitor and/or the inductor with respect to their electrical characteristics such, that said members will provide an amount of energy to the actuator which is sufficient to unlock the plug connectors connected to each other. The term "connected to each other" in the frame of the present invention means that both plug connectors provide an electrical connection between the electric vehicle and the charging device and to this end preferably comprise a mutual form-fit or force-fit connection. The charging device further can be implemented as any means known in the prior art for charging the vehicle's secondary battery of the electric vehicle, such as an electric passenger car.

According to another preferred embodiment of the invention it is provided that the energy source is configured such that the energy source can be charged by the charging device and/or a vehicle's secondary battery associated to the electric vehicle. This means that during a "normal operation", i.e. when the charging device is connected to the electric vehicle for charging the vehicle's secondary battery or the vehicle's secondary battery has a sufficient amount of energy, the energy source can be charged by the charging device and the vehicle's secondary battery, respectively, wherein a person skilled in the art is able to provide a corresponding circuit which, for example, prevents overcharging of the energy source.

The actuator principally can be configured arbitrarily, however, it is particularly preferred that the actuator is configured such that the actuator locks and unlocks the plug connectors preferably connected to each other by an alternately polarized electrical pulse. According to a further embodiment of the invention it is preferred that the actuator is configured such that the actuator remains wattlessly in the locking position and in the unlocking position, respectively, until it receives the electrical pulse. In this way it is advantageously achieved that the actuator on the one side preferably can be driven by a short electrical current pulse and on the other side after reaching its end position, i.e. the locking position and the unlocking position, respectively of the plug connectors, i.e. when the plug connectors are locked to each other or can be released from each other, remains passively in this position, such that even in the locked state of the plug connectors, such as during a charging process of the vehicle's secondary battery of the electric vehicle, the actuator consumes no energy at all. Furthermore, a switch can be provided by means of which the actuator in the case of a power breakdown event or even during the "normal operation" can be driven, such that by operating the switch the plug connectors connected to each other can be locked and unlocked, respectively.

In a further preferred embodiment it is provided that the plug connector comprises a locking means, wherein the locking means is moveable axially or radially with respect to the plug direction of the plug connectors for locking and unlocking the plug connectors by the actuator. Herein the locking means, for example, can include a shaft which in turn drives a cylinder pin for locking and unlocking the plug connectors such that the cylinder pin locks and unlocks the plug connectors connected to each other axially or radially to the plug direction of the plug connectors.

According to another preferred embodiment of the invention it is provided that the energy source is configured as a secondary battery and the plug connector comprises a timing means such that the timing means switches the actuator into a wattless state, preferably into a powerless and/or currentless state, after unlocking the plug connectors connected to each other. Thus, in a preferred way the secondary battery can be prevented from being completely discharged such that the potential for locking and unlocking provided by the energy source with the above configuration according to the present invention can immediately be provided after elimination of the power breakdown state.

Furthermore according to another embodiment of the invention it is preferred that the actuator is configured such that the actuator can be driven by an electrical pulse which can be generated by the charging device and/or by a vehicle's secondary battery associated to the electric vehicle and the plug connector comprises a switching means for the actuator configured such that, if the electrical pulse cannot be generated by the charging device and/or by the vehicle's secondary battery associated to the electric vehicle, the switching means connects the energy source to the actuator. According to this embodiment of the invention it is also provided that the actuator during the "normal operation", i.e. if no power breakdown event on the side of the charging device and/or the vehicle's secondary battery is present, provides for locking and unlocking the plug connectors by use of the energy provided by the charging device and the vehicle's secondary battery, respectively, however, the switching means according to the invention connects the actuator to the energy source in the case of a power breakdown event such that even during a power breakdown event the actuator remains operable by the electrical energy provided by the energy source. The term "electrical pulse" in the frame of the invention on the one side can mean a current and/or voltage edge formed by a current and/or a voltage changeover from a first value to a second value and on the other side a "short-term" pulse formed by a current and/or a voltage changeover from a first value to a second value and thereafter back to the first value.

In this regard it is further preferred that the switching means is configured such that, if the electrical pulse cannot be generated by the charging device and/or the vehicle's secondary battery associated to the electric vehicle, the switching means transmits an electrical pulse generated by the energy source to the actuator for unlocking the plug connectors preferably connected to each other. Thus, according to this embodiment it is provided that, if a power breakdown event occurs, i.e. when neither the charging device nor the vehicle's secondary battery or even only the charging device or only the vehicle's secondary battery are able to provide the electrical pulse, the switching means on the one side automatically connects the actuator to the energy source and on the other side automatically unlocks the plug connectors connected to each other by biasing the actuator with the electrical pulse. In this way it is possible that during a power breakdown event the locking state of the plug connectors is released automatically and the plug connector can be removed from the second plug connector, for example, the connection cable between the electric vehicle and the charging device can be released. Herein the switching means preferably is implemented as a relay.

The object of the invention is further achieved by a charging device or an electric vehicle comprising a plug connector with the abovementioned configuration, wherein the charging device and a vehicle's secondary battery associated to the electric vehicle are configured for generating the electrical pulse. To this end the electric vehicle preferably comprises the vehicle's secondary battery.

BRIEF DESCRIPTION OF DRAWINGS

In the following the invention is explained in greater detail with respect to the accompanying drawing with reference to a preferred embodiment. In the drawing.

DETAILED DESCRIPTION

Figure 1:
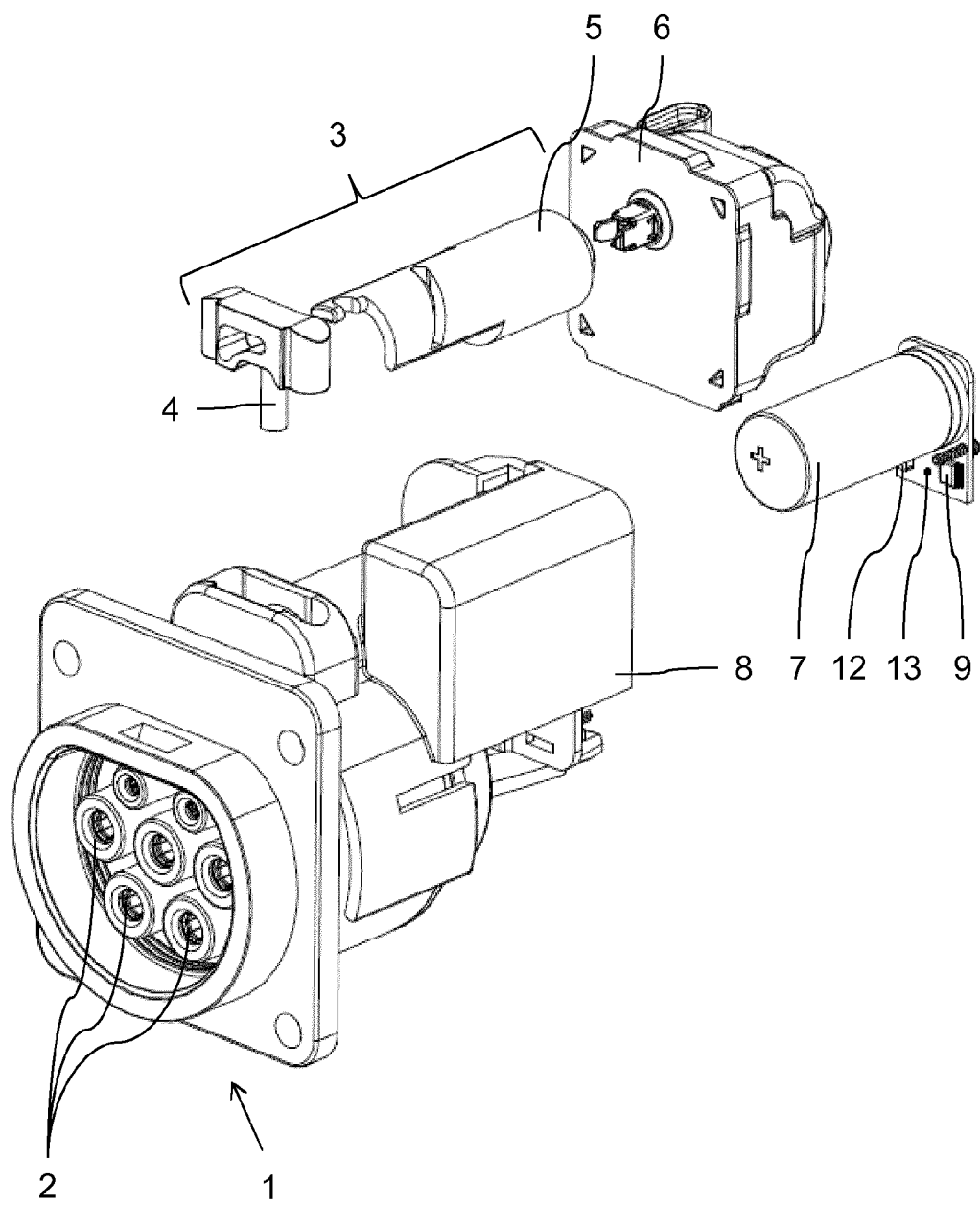
FIG. 1 shows an exploded perspective view of a plug connector according to a preferred embodiment of the invention.

FIG. 1 shows an exploded perspective view of a plug connector 1 according to a preferred embodiment of the invention.

The plug connector 1 which in the present case is implemented as a device connector in the sense of a socket is intended for electrically connecting an electric vehicle to a charging device such that a vehicle's secondary battery associated to the electric vehicle can be charged by electrical energy provided by the charging device. To this end the plug connector 1 comprises various contacts 2 by means of which an electrical connection between the plug connector 1 and a second plug connector can be established. With respect to the concrete implementation of the electrical contacts 2 and the plug connectors 1 we refer to other plug connectors 1 known from prior art.

For locking two plug connectors 1 connected to each other the plug connector 1 comprises a locking means 3 which in the present case is configured both as a cylinder pin 4 and a shaft 5. The locking means 3 can be operated by an actuator 6 such that by means of the actuator 6 the cylinder pin 4 of the locking means 3 can be moved radially with respect to the plug direction of the plug connectors 1 through the shaft 5, such that the plug connectors 1 connected to each other can be locked and unlocked by means of the cylinder pin 4. In the locked state the second plug connector which, for example, is associated to a connection cable between the charging device and the electric vehicle, cannot be released from the first plug connector 1.

Although not shown in FIG. 1 the locking means 3 can also be configured such that the cylinder pin 4 is movable in the axial plug direction of the plug connectors 1 by the actuator 6 for locking and unlocking the plug connectors 1.

The actuator 6 in the present case is configured such that the actuator 6 can be driven by an electrical pulse, i.e. an electrical current pulse, i.e. the actuator locks and unlocks the plug connectors 1 connected to each other by means of an alternately polarized electrical current pulse. After having received the electrical pulse, i.e. subsequent to a locking or unlocking operation, the actuator remains wattless in the locking and unlocking position, respectively, until a further electrical pulse causes the actuator 6 to lock or unlock the plug connectors 1.

During a "normal operation", i.e. if, for example, the plug connector 1 integrated into the charging device is supplied with electrical energy, the electrical pulse for the actuator 6 is provided by the electrical energy supplied by the charging device and/or the vehicle's secondary battery.

According to the invention now it is provided that the plug connector 1 comprises an electrical energy source 7 which in the present case is implemented as a capacitor, such as an electrolytic capacitor. Herein the energy source 7 is dimensioned such that the energy source 7 in the case of a power breakdown event, i.e. if the charging device does not provide a sufficient amount of energy for operating the actuator 6, operates the actuator 6 by an electrical pulse provided by the energy source 7, such that the plug connectors 1 connected to each other can be unlocked and separated from each other.

Due to the fact that the energy source 7 is integrated within the plug connector 1 which in the present case is realized by use of a housing 8 into which the energy source can be inserted, the plug connector 1 according to the invention can be configured in a particularly space-saving manner and, thus, can be applied to any charging devices and/or electric vehicles known in the prior art.

Figure 2:
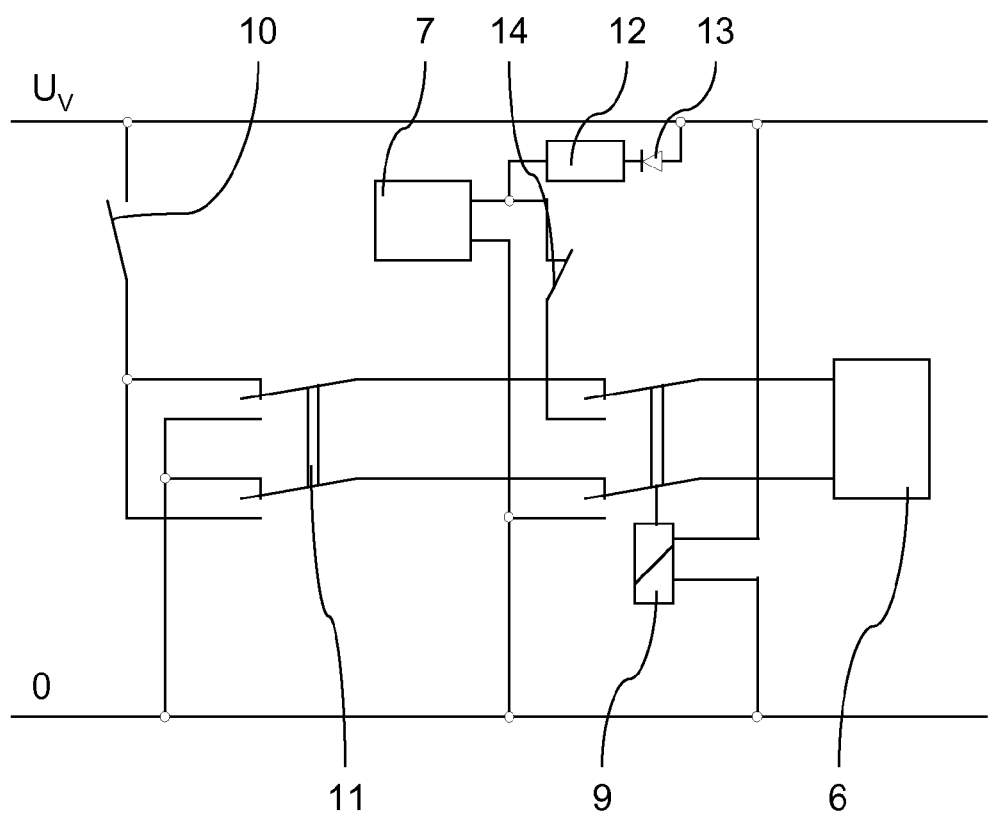
FIG. 2 shows an equivalent circuit diagram for driving an actuator of the plug connector according to the preferred embodiment of the invention.

Herein according to FIG. 2 the actuator 6 is connected to the energy source 7 through the switching means 9, which in the present case is implemented as a relay. As further is obvious from the equivalent circuit diagram in FIG. 2 the operation of the actuator 6 for locking and unlocking in the "normal operation" is done by means of a supply voltage $U_v$ provided by the charging device or the vehicle's secondary battery such that by means of a switch 10 the actuator 6 can be driven through a polarization changeover circuit 11 by alternately polarized short current pulses. If, however, the voltage $U_v$ is interrupted during a power breakdown event the actuator 6 can be operated by the energy source 7. To this end it is also possible that during a power breakdown event the actuator 6 automatically releases the locking state of the plug connectors 1 by means of the energy provided by the energy source 7.

If the energy source 7 is realized by means of a capacitor, as in the present case, preferably a resistor 12 and a diode 13 will be provided, over which the capacitor can be charged up to its operation voltage by the voltage $U_v$. In case of a power breakdown event, i.e. if $U_v$ is interrupted, according to the equivalent circuit diagram the capacitor is connected to the actuator 6 through the switching means 9 and is discharged low-ohmic over the actuator 6 such that the actuator 6 releases the locking state between the plug connectors 1.

If the energy source 7 is implemented as a secondary battery preferably a timing means 14 is provided, wherein the timing means 14 switches the actuator 6 into a wattless state after unlocking the plug connectors 1 connected to each other.

Thus, according to the invention it is enabled in a particular simple way that during a power breakdown event at the charging device the locking state between the plug connectors 1 can automatically be released in a simple way.

LIST OF REFERENCE SYMBOLS

1 Plug connector
2 Electrical contacts
3 Locking means
4 Cylinder pin
5 Shaft
6 Actuator
7 Energy source
8 Housing
9 Switching means
10 Switch
11 Polarization changeover circuit
12 Resistor
13 Diode
14 Timing means

The invention claimed is:

1. A plug connector for electrically connecting an electric vehicle to a charging device, wherein
the plug connector is designed to establish an electrical connection to a second plug connector associated to the electric vehicle or the charging device,
the plug connector comprises an actuator which can be driven by an electrical pulse, adapted for locking and unlocking the plug connectors and
wherein the plug connector comprises an energy source for storing an electrical energy and for generating the electrical pulse such that the energy required for locking and unlocking the plug connectors connected to each other can be provided by the plug connector itself.

2. The plug connector according to claim 1, wherein the energy source is implemented as a secondary battery, a capacitor and/or an inductor.

3. The plug connector according to claim 1, wherein the energy source is configured such that the energy source can be charged by the charging device and/or a vehicle's secondary battery associated to the electric vehicle.

4. The plug connector according to claim 1, wherein the actuator is configured such that the actuator locks and unlocks the plug connectors by an alternately polarized electrical pulse.

5. The plug connector according to claim 1, wherein the actuator is implemented such that the actuator remains wattles sly in the locking state or in the unlocking state until the actuator receives the electrical pulse.

6. The plug connector according to claim 1, comprising a locking means for the plug connectors, wherein the locking means can be moved axially or radially with respect to the plug direction of the plug connectors for locking and unlocking the plug connectors by means of the actuator.

7. The plug connector according to claim 1, wherein the energy source is configured as a secondary battery, including a timing means, wherein the timing means is configured such that the timing means switches the actuator into a wattless state after unlocking the plug connectors connected to each other.

8. The plug connector according to claim 1, wherein the actuator is configured such that the actuator can be driven by an electrical pulse generated by the charging device and/or a vehicle's secondary battery associated to the electrical vehicle and the plug connector comprises a switching means for the actuator configured such that, when the electrical pulse cannot be generated by the charging device and/or the vehicle's secondary battery associated to the electrical vehicle, the switching means connects the energy source to the actuator.

9. The plug connector according to claim 8, wherein the switching means is configured such that, when the electrical pulse cannot be generated by the charging means and/or the vehicle's secondary battery associated to the electrical vehicle, the switching means transmits an electrical pulse generated by the energy source for unlocking the plug connectors.

* * * * *